(No Model.)
R. N. ALLEN.
MOTOR CAR.
No. 337,109. Patented Mar. 2, 1886.
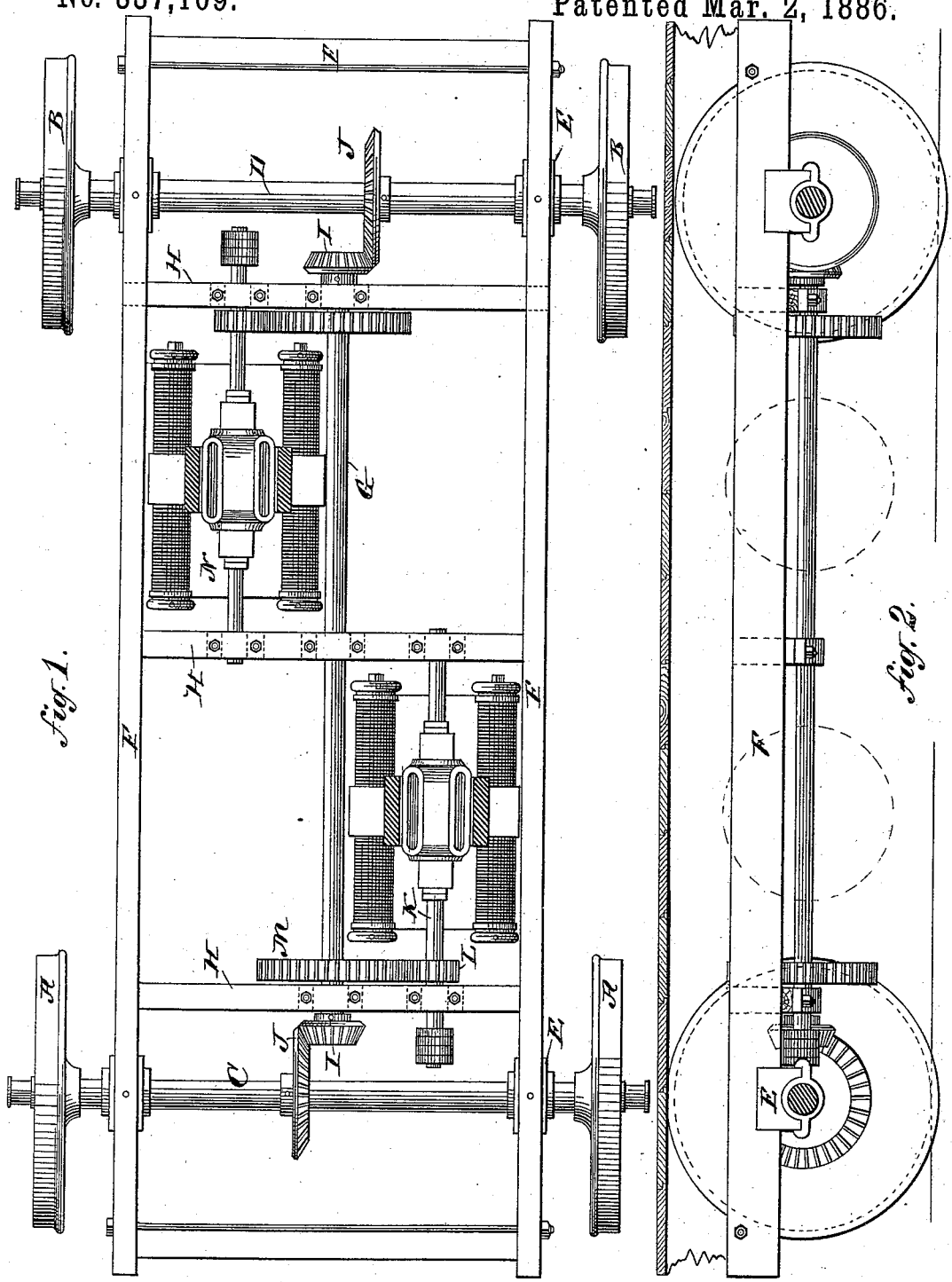
Witnesses:
A. B. Jones
R. F. Gaylord
Inventor
R. N. Allen
by Paul A. Duncan
atty

UNITED STATES PATENT OFFICE.

RICHARD N. ALLEN, OF CLEVELAND, OHIO.

MOTOR-CAR.

SPECIFICATION forming part of Letters Patent No. 337,109, dated March 2, 1886.

Application filed January 26, 1885. Serial No. 153,942. (No model.)

*To all whom it may concern:*

Be it known that I, RICHARD N. ALLEN, of Cleveland, in the county of Cuyahoga and State of Ohio, have invented certain new and useful Improvements in Motor-Cars, of which the following is a full, clear, and exact description.

This invention relates to cars that carry their own motor, and particularly to cars driven by an electro-motor. Its object is to arrange the motor so that it will have a positive and rigid connection with all of the wheels of the car; and the invention consists in supporting the motor that is to drive the car upon a frame that rests directly upon or is rigidly attached to each of the axles of the car-wheels.

In the drawings accompanying this specification, Figure 1 is a plan view of a frame and the wheels of a car arranged according to my invention, and Fig. 2 is a side or elevation view of the same.

Referring to these views in detail, A represents the front wheels, and B the rear wheels, of a car, C and D being respectively their axles. Attached to the boxes E of these axles is the frame F, which extends from one axle to the other and holds the axles in rigid relation.

G is the main or driving shaft, supported upon cross-beams H of the main frame, and provided at each end with bevel-gears I, which mesh with corresponding gear-wheels, J, upon each axle.

K is the armature shaft of an electro-motor, hung between cross-bars of the main frame, and this shaft is provided with a gear, L, that meshes with a gear-wheel, M, upon the driving-shaft G.

N represents the armature-shaft of another electro-motor, arranged in the same way and similarly connected with the main driving-shaft. The motors are designed to be driven by power taken from a conductor running along the track or by stored power carried on the car. The object in using the two electro-motors is that it is found most economical and efficient to run such motors at practically their maximum speed and power, and hence it is designed that one motor shall suffice to drive the car under all ordinary conditions, the second motor being brought into use only when it is necessary to meet some unusual emergency in the way of extra load or an obstructed or upgrade track.

The body of the car is attached to or rests on the ends of the axles, outside of the car-wheels, in the usual way, and is wholly independent of the motor-carrying frame, so that its various movements, whether by reason of a varying load or otherwise, will have no influence to interrupt the positive relation of the driving-motor and the driven wheels and axles.

It will be seen that the working parts are all arranged rigidly with relation to each other, and therefore that the application of the driving-power can be more effectively made than where—as heretofore has been common—the motor has been attached to some part that was capable of moving relatively to the axles of the car-wheels, the motor being connected with the axles by means of belts or other flexible or yielding power-transmitting devices. It is to be further noticed that the axles of the car are connected together by the driving mechanism, so that the driving-power is distributed to all the wheels, which must all revolve together, and the maximum hold upon the rails is thereby secured. A further and special advantage is secured by thus gearing all the axles and motor together in one rigid system, which is that if the wheels at one end of the frame drop into a depression or cross a switch, branch track, or any similar place in the track where either pair of wheels may momentarily leave the rails or otherwise lose their hold upon the rails, the other pair of wheels will be in working contact with the rails, and thus prevent the motor being injured by jumping ahead at full speed when thus relieved of its load and when at high speed, having its full load thrown suddenly upon it by again grasping the rails, as would be the case did the driving mechanism not extend to both pairs of wheels and connect them so that they must revolve together. For the same reasons the motion of the cars is more regular, and the wear of both cars and driving mechanism is reduced.

I am aware that it is not new to support an electric motor upon a frame or truck that rigidly connects the axles of the truck, such motor being arranged to drive one of said axles; also, that it is not new to drive two axles by devices common to both and operated from a motor attached to the car-body or other part having motion relatively to the frame uniting the axles; but these I do not claim.

What I do claim as new is—

In combination, the axles C and D, the frame F, rigidly uniting the axles, the driving-shaft G, geared to both axles, and the motor rigidly supported upon said frame and geared to the main shaft, substantially as and for the purpose set forth.

In witness whereof I have hereunto set my hand in the presence of two subscribing witnesses.

RICHARD N. ALLEN.

Witnesses:
R. F. GAYLORD,
ROBT. H. DUNCAN.